US006548154B1

(12) United States Patent
Stanton et al.

(10) Patent No.: US 6,548,154 B1
(45) Date of Patent: Apr. 15, 2003

(54) ELECTRICAL CHARGE RELAXABLE WEAR RESISTANT COATING FOR BIAS CHARGING OR TRANSFER MEMBER

(75) Inventors: Donald S. Stanton, Penfield, NY (US); Bing R. Hsieh, Webster, NY (US); Allen J. Thompson, Sodus, NY (US); Yuan Yu, Nashua, NH (US); William H. Wayman, Ontario, NY (US); Michelle L. Schlafer, Fairport, NY (US); Heiko Rommelmann, Penfield, NY (US); Ann M. Kazakos, Webster, NY (US); Alan R. Kuntz, Webster, NY (US)

(73) Assignee: Xerox Corporation, Stamford, CT (US)

( * ) Notice: Subject to any disclaimer, the term of this patent is extended or adjusted under 35 U.S.C. 154(b) by 184 days.

(21) Appl. No.: 09/722,513

(22) Filed: Nov. 28, 2000

(51) Int. Cl.[7] .............................. B32B 7/02; B32B 5/16; B32B 27/08; H01B 5/10

(52) U.S. Cl. ....................... 428/212; 428/220; 428/323; 428/329; 428/332; 428/339; 428/423.1; 428/423.5; 428/423.7; 428/424.2; 428/474.4; 428/475.2; 428/475.8; 428/515; 428/906; 428/931

(58) Field of Search ................................ 399/313, 314, 399/168, 174, 310; 428/34.1, 34.4, 34.5, 34.6, 34.7, 35.7, 36.5, 36.9, 36.91, 411.1, 474.4, 474.7, 475.2, 476.3, 480, 423.1, 423.5, 423.7, 500, 515, 906, 908.8, 923, 924–926, 931, 212, 220, 323, 328, 329, 332, 339, 475.8

(56) References Cited

U.S. PATENT DOCUMENTS

| | | | | | |
|---|---|---|---|---|---|
| 2,807,233 | A | | 9/1957 | Fitch | 366/257 |
| 3,043,684 | A | | 7/1962 | Mayer | 430/55 |
| 3,267,840 | A | | 8/1966 | Honma et al. | 101/494 |
| 3,328,193 | A | | 6/1967 | Oliphant et al. | 430/117 |
| 3,598,580 | A | | 8/1971 | Baltazzi et al. | 430/126 |
| 3,625,146 | A | | 12/1971 | Hutchison | 101/143 |
| 3,630,591 | A | | 12/1971 | Eastman | 399/398 |
| 3,684,364 | A | | 8/1972 | Schmidlin | 399/176 |
| 3,691,993 | A | | 9/1972 | Krause et al. | 118/638 |
| 3,702,482 | A | | 11/1972 | Dolcimascolo et al. | 347/139 |
| 3,781,105 | A | | 12/1973 | Meagher | 399/314 |
| 3,832,055 | A | | 8/1974 | Hamaker | 399/313 |
| 3,847,478 | A | | 11/1974 | Young | 399/309 |
| 3,959,574 | A | * | 5/1976 | Seanor et al. | 428/425 |
| 4,062,812 | A | | 12/1977 | Safford et al. | 252/500 |
| 4,116,894 | A | | 9/1978 | Lentz et al. | 521/94 |
| 4,387,980 | A | | 6/1983 | Ueno et al. | 399/174 |
| 5,241,343 | A | | 8/1993 | Nishio | 399/90 |
| 5,506,745 | A | | 4/1996 | Litman | 361/225 |
| 5,529,842 | A | * | 6/1996 | Hoshizaki et al. | 428/329 |
| 5,576,805 | A | | 11/1996 | Ishihara et al. | 399/176 |
| 5,625,858 | A | | 4/1997 | Hirai et al. | 399/176 |
| 5,666,606 | A | | 9/1997 | Okano et al. | 399/174 |
| 5,765,077 | A | | 6/1998 | Sakurai et al. | 399/176 |
| 6,142,922 | A | * | 11/2000 | Yoshikawa et al. | 492/56 |

* cited by examiner

*Primary Examiner*—Paul Thibodeau
*Assistant Examiner*—Sheeba Ahmed
(74) *Attorney, Agent, or Firm*—Oliff & Berridge, PLC

(57) ABSTRACT

A bias transfer member or bias charging member for a xerographic device includes a support substrate, and a multi-layer conductive surface coating over the support substrate. The multi-layer coating includes a base layer of metal-containing particles in a polymer binder, an intermediate layer of conductive particles in a polymer binder, and a top layer of conductive particles in a polymer binder, wherein the amount of the conductive particles in the top layer is greater than the amount of the conductive particles in the intermediate layer. The multi-layer coating exhibits ideal electrical and abrasion resistance performance for use in bias charging or transfer members.

19 Claims, 1 Drawing Sheet

ELECTRICAL CHARGE RELAXABLE WEAR RESISTANT COATING FOR BIAS CHARGING OR TRANSFER MEMBER

BACKGROUND OF THE INVENTION

1. Field of the Invention

The features of the present invention are useful in the printing arts and more particularly in xerographic printing, e.g., electrophotographic or electrostatographic printing. The present invention relates to bias charging members or bias transfer members and copying devices utilizing such members, and more particularly to such members having a particular multi-layer conductive surface coating.

2. Discussion of Related Art

In the well-known process of electrophotographic or electrostatographic printing, the charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as toner. Toner is held on the image areas by the electrostatic charge on the photoreceptor surface. Thus, a toner image is produced in conformity with a light image of the original being reproduced or printed. The toner image may then be transferred to a substrate or support member (e.g., paper) directly or through the use of an intermediate transfer member, and the image affixed thereto to form a permanent record of the image to be reproduced or printed. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

The described electrostatographic copying process is well known and is commonly used for light lens copying of an original document. Analogous processes also exist in other electrostatographic printing applications such as, for example, digital laser printing or ionographic printing and reproduction where charge is deposited on a charge retentive surface in response to electronically generated or stored images.

To charge the surface of a photoreceptor, a contact type charging device has been used. The contact type charging device includes a conductive member which is supplied a voltage from a power source with a D.C. voltage superimposed with a A.C. voltage of no less than twice the level of the D.C. voltage. The charging device contacts the image bearing member (photoreceptor) surface, which is a member to be charged. The outer surface of the image bearing member is charged with the rubbing friction at the contact area. The contact type charging device charges the image bearing member to a predetermined potential. Typically the contact type charger is in the form of a roll charger such as that disclosed in U.S. Pat. No. 4,387,980, the relative portions thereof incorporated herein by reference.

In contact type charging systems, it is important that the charging member contacts the image bearing member uniformly along the length thereof. Contact charge type rollers therefore typically include a conformable material to maintain the contact with the photoconductive member. In typical printing applications, the A.C. and D.C. voltages are applied to a roll type charger in contact with a photoconductive drum.

U.S. Pat. No. 5,765,077 discloses a charging member for charging a member to be charged includes a base member, a surface elastic member supported by the base member. The elastic member includes a foamed member and a coating layer covering the foamed member. A surface of the charging member has an Asker-C hardness of not more than 55 degrees and an international rubber hardness (IRHD) of not more than 80 degrees.

U.S. Pat. No. 5,666,606 discloses an image forming apparatus including a image bearing member having a photosensitive layer, a surface protection layer having fluorine resin material, and a charging member contactable to the image bearing member to electrically charge the image bearing member. The charging member is capable of being supplied with an oscillation voltage. A peak-to-peak voltage of the oscillating voltage applied across a gap between a surface of the charging member and the surface of the image bearing member is not less than twice a charge starting voltage of the image bearing member in the gap and not more than 1600 volt.

U.S. Pat. No. 5,625,858 discloses a contact charging member to be abutted against a charge-receiving member and supplied with a voltage for charging the charge-receiving member is provided. The charging member includes an electroconductive substrate, an elastic layer and a surface layer disposed in lamination. The surface layer comprises crosslinked polymer crosslinked by irradiation with an electron beam. The surface layer may preferably be in the form of a seamless tube formed of the crosslinked polymer. The surface layer crosslinked by electron beam irradiation is less liable to suffer from transfer of a crosslinking agent or a decomposition product thereof to the charge-receiving member. Accordingly, the charging member shows improved durability and stably uniform charging ability suitable for electrophotographic image formation under various environmental conditions.

U.S. Pat. No. 5,576,805 discloses a charging member contactable to a member to be charged to electrically charge it, the improvement residing in that a micro hardness of an end region, with respect to a longitudinal direction, of the charging member is larger than that in a central region of the charging member.

U.S. Pat. No. 5,529,842 describes a charge roll for electrophotography wherein the surface of the roll is formed from a resin layer containing $BaSO_4$ particles coated with $SnO_{2-x}$ (wherein $0<X<1$) is disclosed. The charge roll may comprise a roll shaft, an electroconductive elastic layer and the surface resin layer. The charge roll may further comprise an intermediate layer formed between the electroconductive elastic layer and the surface resin layer.

U.S. Pat. No. 5,506,745 discloses a device for charging a member. The device includes a roller contactable with the member to charge the member. The roller includes an elongated cylinder defining a central cavity in the elongated cylinder. The cylinder is flexible in a radial direction toward the central cavity. The device also includes an electrical biaser for electrically biasing the roller.

U.S. Pat. No. 5,241,343 discloses a conductive foam rubber roller is used as charging roller, developing roller, toner-removing roller, or transfer roller in an image formation apparatus such as an electrophotographic recording apparatus, and comprises a tubular roller element made of a conductive foam rubber material and having a central bore defined by a solid skin layer having an electric resistivity considerably higher than that of a foam structure of the rubber element, and a conductive shaft on which the roller element is mounted and fixed. End sections of the skin layer are removed from the roller element such that the foam structure thereof is in direct contact with the shaft at end sections of the bore thereof. Alternatively, a conductive disc-like member having a central opening formed therein is inserted onto the shaft to be abutted against an end face of the roller element, whereby sufficient electric contact can be established between the roller element and the shaft.

The operation of transferring developing material from the photoreceptive member to the image support substrate is realized at a transfer station. In a conventional transfer station, transfer is achieved by applying electrostatic force fields in a transfer nip sufficient to overcome forces holding the toner particles to an original support surface on the photoreceptive member. These electrostatic force fields operate to attract and transfer the toner particles over onto the copy sheet or other support surface.

Biased roll transfer systems have been used successfully to accomplish toner transfer. This type of transfer was first disclosed in U.S. Pat. No. 2,807,233 which disclosed the use of a metal roll coated with a resilient coating having an approximate resistivity of at least $10^6$ ohm-cm, providing a means for controlling the magnetic and non-magnetic forces acting on the toner during transfer. Bias roll transfer has become the transfer method of choice in many state-of-the-art xerographic copying systems and apparatuses. Notable examples of biased roll transfer systems are described in U.S. Pat. Nos. 3,702,482 and 3,781,105. Other general examples of biased roll transfer systems can be found in U.S. Pat. Nos. 3,043,684, 3,267,840, 3,328,193, 3,598,580, 3,625,146, 3,630,591, 3,684,364, 3,691,993, 3,832,055 and 3,847,478.

The process of transferring development materials in an electrostatographic system involves the physical detachment and transfer-over of charged particulate toner materials from one surface into attachment with a second surface via electrostatic force fields. The critical aspect of the transfer process focuses on maintaining the same pattern and intensity of electrostatic fields as on the original latent electrostatic image being reproduced to induce transfer without scattering or smearing of the developer material. This difficult requirement is met by careful control of the electrostatic fields that, by necessity, must be high enough to effect toner transfer while being low enough so as not to cause arcing or excessive ionization at undesired locations. Such electrical disturbances can create copy or print defects by inhibiting toner transfer or by inducing uncontrolled transfer of the development materials.

U.S. Pat. No. 4,062,812 discloses a method for extending the electrical life of copolymers used in bias transfer rolls. The patent recognizes that control of, and minimization of, the variations in the resistivity under applied voltages with respect to time is important. Thus, certain salts having a particular geometric make-up which are useful for extending the functional electrical life and electrical stability of materials are incorporated into the materials used in xerographic devices.

U.S. Pat. No. 4,116,894 also discloses compositions and a method for enhancing the electrical life of copolymers used in xerographic devices. The patent discloses a specific method for enhancing the electrical life of butadiene copolymers having solubilized conductivity control agents incorporated therein by varying specified quantities of terminally unsaturated hydrocarbonated nitrites in the butadiene.

There is still a need for improved materials for use as either or both a bias charging member or a bias transfer member surface layer, particularly as to the properties of both electrical performance and abrasion resistance.

SUMMARY OF THE INVENTION

It is therefore one object of the present invention to develop a coating for a bias charging member or bias transfer member that has superior electrical performance as well as abrasion resistance.

This and other objects are achieved by the present invention wherein a bias transfer member or bias charging member for a xerographic device includes a support substrate, and a multi-layer conductive surface coating over the support substrate. The multi-layer coating includes a base layer of metal-containing particles in a polymer binder, an intermediate layer of conductive particles in a polymer binder, and a top layer of conductive particles in a polymer binder, and the amount of the conductive particles in the top layer is greater than the amount of the conductive particles in the intermediate layer. This multi-layer coating exhibits ideal electrical and abrasion resistance performance for use in bias charging or transfer members.

DETAILED DESCRIPTION OF PREFERRED EMBODIMENTS

Figure 1:
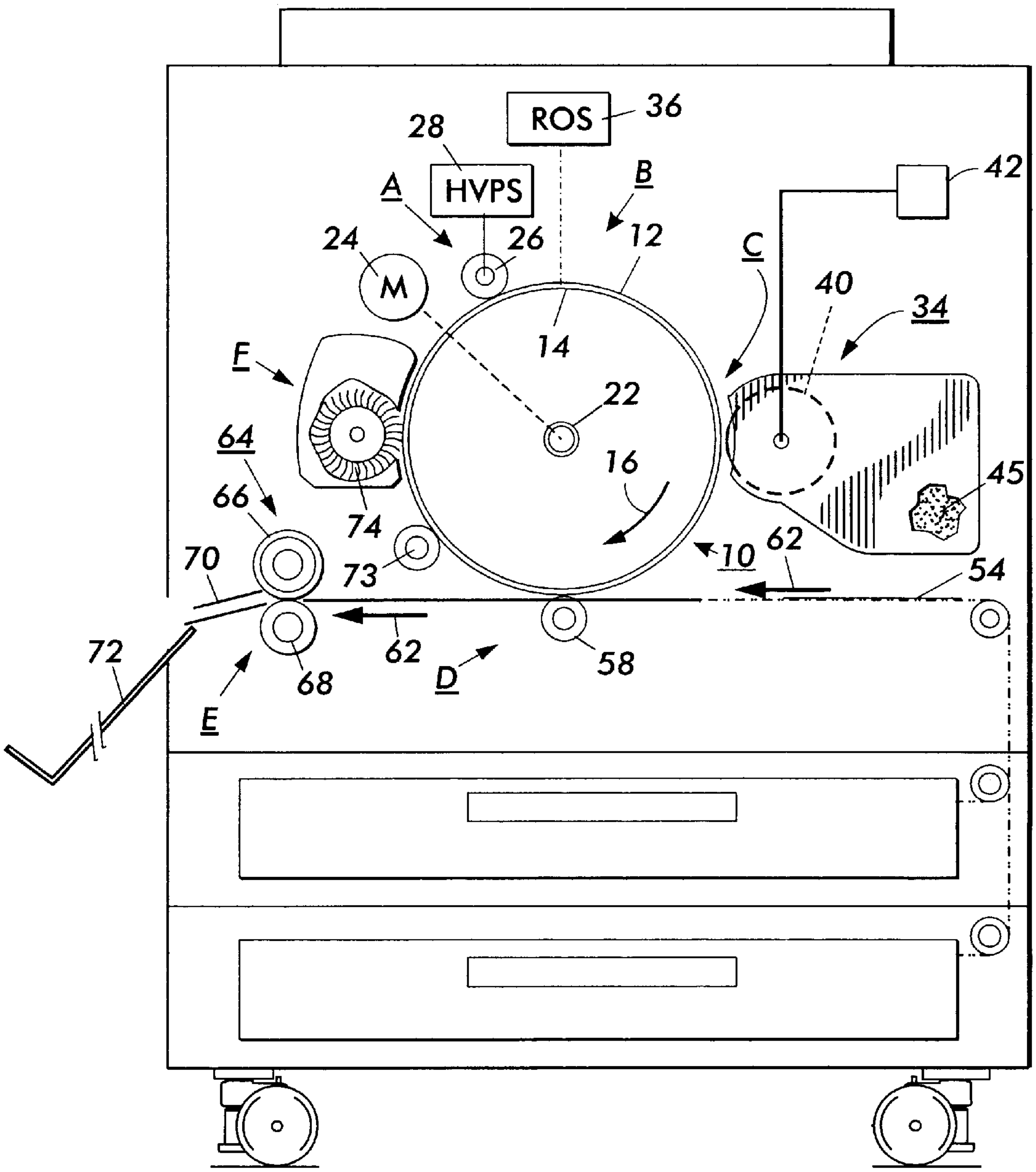
FIG. 1 schematically illustrates a xerographic device including both a bias charging member and a bias transfer member.

For a general understanding of the illustrative electrophotographic or electrostatographic (xerographic) printing machine incorporating the features of the present invention, reference is made to the drawings. In the drawings, like reference numerals have been used throughout to designate identical elements. FIG. 1 schematically depicts the various components of an electrophotographic printing machine incorporating the bias charge roll of the present invention therein. Although the bias charge roll and bias transfer roll of the present invention are particularly well adapted for use in the illustrated printing machine, the bias charge roll and bias transfer roll are equally well suited for use in a wide variety of printing machines and are not necessarily limited in application to the particular embodiment shown herein.

Referring now to FIG. 1, the xerographic device shown employs a photoconductive drum, although photoreceptors in the form of a belt are also known, and may be substituted therefor. The drum has a photoconductive surface deposited on a conductive substrate 14. The drum moves in the direction of arrow 16 to advance successive portions thereof sequentially through the various processing stations disposed about the path of movement thereof. Motor 24 rotates roll 22 to advance the drum in the direction of arrow 16. Drum is coupled to motor 24 by suitable means such as a drive.

Initially, successive portions of drum pass through charging station A. At charging station A, a corona generating device, in the form of a bias charging roll which is indicated generally by the reference numeral 26, charges the drum 10 to a selectively high uniform electrical potential, preferably negative.

In a digital printing machine as shown in FIG. 1, the drum 100 passes through imaging station B where a ROS (Raster Optical Scanner) 36 may lay out the image in a series of horizontal scan lines with each line having a specific number of pixels per inch. The ROS 36 may include a laser (not shown) having a rotating polygon mirror block associated therewith. The ROS 36 exposes the photoconductive surface 12 of the belt.

It should be appreciated that the printing machine may alternatively be a light lens copier. In a light lens copier, a document to be reproduced is placed on a platen, located at the imaging station, where it is illuminated in known manner by a light source such as a tungsten halogen lamp. The document thus exposed is imaged onto the drum by a system of mirrors. The optical image selectively discharges the surface of the drum in an image configuration whereby an electrostatic latent image of the original document is recorded on the drum at the imaging station.

At development station C, a development system or unit, indicated generally by the reference numeral 34, advances developer materials into contact with the electrostatic latent images. Preferably, the developer unit includes a developer roller mounted in a housing. Thus, developer unit 34 contains a developer roller 40. The roller 40 advances toner particles 45 into contact with the latent image. Appropriate developer biasing may be accomplished via power supply 42, electrically connected to developer unit 34.

The developer unit 34 develops the charged image areas of the photoconductive surface. This developer unit contains magnetic black toner particles 45, for example, which are charged by the electrostatic field existing between the photoconductive surface and the electrically biased developer roll in the developer unit. Power supply 42 electrically biases the magnetic roll 40.

A sheet of support material (image receiving substrate) 54 is moved into contact with the toner image at transfer station D. The sheet of support material is advanced to transfer station D by a suitable sheet feeding apparatus, not shown. Preferably, the sheet feeding apparatus includes a feed roll contacting the uppermost sheet of a stack of copy sheets. Feed rolls rotate so as to advance the uppermost sheet from the stack into a chute which directs the advancing sheet of support material into contact with the photoconductive surface of drum 10 in a timed sequence so that the toner powder image developed thereon contacts the advancing sheet of support material at transfer station D.

Transfer station D includes a corona generating device 58 in the form of a bias transfer roll, which applies ions of a suitable polarity onto the backside of sheet 54. This attracts the toner powder image from the drum 10 to sheet 54, i.e., it establishes a directional force field capable of attracting toner particles from the photoconductive surface 10 to support material 54. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 54. Preferably, fuser assembly 64 comprises a heated fuser roller 66 and a pressure roller 68. Sheet 54 passes between fuser roller 66 and pressure roller 68 with the toner powder image contacting fuser roller 66. In this manner, the toner powder image is permanently affixed to sheet 54. After fusing, a chute 70 guides the advancing sheet 54 to a catch tray 72 for subsequent removal from the printing machine by the operator. It will also be understood that other post-fusing operations can be included, for example, stapling, binding, inverting and returning the sheet for duplexing and the like.

After the sheet of support material is separated from the photoconductive surface of drum 10, the residual toner particles carried by image and the non-image areas on the photoconductive surface removed at cleaning station F. The vacuum assisted, electrostatic, brush cleaner unit or cleaning blade is disposed at the cleaning station F to remove any residual toner remaining on the surface of the drum.

It is believed that the foregoing description is sufficient for purposes of the present application to illustrate the general operation of an electrophotographic printing machine incorporating the development apparatus of the present invention therein.

The bias charging member and bias transfer member will now be structurally explained in further detail. As both members may have substantially the same structure, each is described together below, the discussion referring to the bias member in general as intended for both the bias charging member and the bias transfer member unless otherwise noted.

In general, the bias member may take any suitable form, including roll, drum, belt, etc. Most preferably, the bias member is in the form of a roll.

The bias member is electrically connected to high voltage power supply. The high voltage power supply may be any conventional power source and typically will include a D.C. voltage, superimposed with an A.C. voltage that is, for example, no less than twice the level of the D.C. voltage.

The bias member includes a substrate, which in the preferred case is a shaft for a roll. A shaft may have a diameter of from, for example, about 1 to about 50 mm, although larger or smaller diameters may be used, as desired. The substrate may be made of any suitable, durable material and may for example be made of a metal such as aluminum, steel, etc., or may be made of a conductive or insulative polymer with a metal surface coating such as copper, nickel, etc., that may be formed by electroless plating of the metal onto the polymer. Preferably, the substrate is electrically conductive.

The multi-layer conductive surface coating of the present invention may be formed directly on the surface of the roll substrate. For example, in the case that the surface of the bias member will contact a photoreceptor having a strong surface such as amorphous silicon, the multi-layer surface may be formed directly on the roll shaft. However, the bias member of the invention may also include a deformable layer between the support substrate and the multi-layer conductive surface coating in order to improve uniformity in contact with the photoconductive imaging member surface and to improve pressure resistance. As the deformable layer, any material possessing an ability to deform upon application of pressure and then return to its original form following removal of the pressure may be used without restriction. For example, the deformable layer may comprise a foam, an elastomer or a rubber. The deformable layer may be conductive, semi-conductive or insulative. The deformable layer may have any suitable thickness, for example from about 1 mm to about 50 mm, although even thinner deformable layers may be used.

The deformable layer may be formed upon the substrate in any suitable manner without restriction. If desired, an adhesive may be used to attach the deformable layer to the substrate.

Both the bias charging member and the bias transfer member may be mounted in the printing machine in any suitable fashion. For example, a roll may be mounted to a housing of the printing machine by supports secured to the shaft of the roll. The housing may simply be part of the frame of the printing machine or may be a separate housing to provide for a, for example, charging module or transfer module whereby the bias charging roll or bias transfer roll may be simply and easily removed from the printing machine. The supports may be any suitable support for rotatably supporting the roll. For example, the supports may be a sleeve bearing made of suitable material for rotatably supporting the shaft of the roll.

The bias members may have any size capable of transferring/supplying the required charge for charging and transfer. Preferably, the bias member has a length sufficient to supply a charge to the entire width of the photoconductive drum or belt.

As to the bias transfer member, a configuration is shown wherein the bias transfer roll is urged physically against belt, forming a nip therebetween and having no opposing support member thereagainst, such that the bias transfer roll causes the path of belt to be slightly bowed, thereby increasing the contact dwell time between the belt and the bias transfer roll. However, it should be understood that a backup roll (not shown) may be provided opposite the transfer roll for urging the belt into contact with the transfer roll with minimal or no distortion in the path of belt.

An electrical biasing device in the form of a constant current source is electrically coupled to the conductive substrate of the bias member providing an electrical bias thereto. An internal heating element may also be provided for maintaining the temperature of the bias member at a predetermined level.

Overlying the substrate (optionally having a deformable layer thereon as discussed above) of the bias member is a relatively thin, multi-layer conductive surface coating. The multi-layer coating comprises at least three layers. The first or base layer that is closest to the substrate comprises metal-containing particles in a polymer binder. An intermediate layer over the base layer comprises conductive particles in a polymer binder. The top or outermost layer of the coating also comprises conductive particles in a polymer binder, but the amount of the conductive particles in the top layer is required to be greater than the amount of the conductive particles in the intermediate layer.

The polymer binder of each of the base layer, the intermediate layer and the top layer may be the same or different. Any suitable polymer binder material may be used without restriction. Preferably, the polymer binder is a polyurethane, polyurea, polyolefin, polyester, polyamide and mixtures or copolymers thereof. Most preferably, the binder of all three layers of the multi-layer coating is polyurethane.

As to the base layer of the multi-layer coating, the metal-containing particles contain one or more metals, for example of one or more of magnesium, tin and aluminum. The particles may also contain non-metals such as, for example, silicon.

The metal-containing particles may have any form, but are most preferably either spherical or rod-like. Most preferably, the base layer includes both spherical particles, for example having a size (volume average diameter as measured by a Coulter Counter) of about 10.0 microns or less, preferably about 7.0 microns or less, and rod-like particles, i.e., rods, for example having a size (volume average length) of about 1.0 microns or less, preferably about 0.5 microns or less. In a most preferred embodiment, the metal-containing spherical particles are comprised of magnesium, tin and silicon and the metal-containing rods are comprised of aluminum and silicon.

The conductive particles of each of the intermediate layer and the top layer may be the same or different. As preferred examples of conductive particles that may be used, mention can be made of finely sized carbon black and graphite. In a most preferred embodiment, the conductive particles of both the top layer and intermediate layer are carbon black.

The conductive particles must have a size (volume average diameter) less than the thickness of the layer within which they are contained. Preferably, the conductive particles have a size of, for example, 25.0 microns or less, preferably 10.0 microns or less.

The amount of conductive particles in the top layer must be greater than the amount of conductive particles in the intermediate layer. For example, the top layer contains at least about 10% by weight of the conductive particles and the intermediate layer contains at least about 1% less conductive particles than the top layer.

Preferably, the base layer has a thickness of about 75 microns or less, the intermediate layer has a thickness of about 100 microns or less and the top layer has a thickness of about 75 microns or less. The multi-layer surface conductive coating preferably has a total thickness of about 200 microns or less.

The layers may also include additional well-known additives as desired, for example including adhesion promoters, curing aids, and the like. Each of the layers may be formed from a composition made by mixing the components of the layer, with or without a solvent. The layers may be formed by any suitable process, for example by dip coating, spraying, etc. The layers may be partially or fully dried/cured before the next layer is applied.

As one example of a suitable coating meeting the above compositional requirements, mention may be made of E/M-6247, a commercial coating system available from E/M Engineered Coating Solutions of Peachtree City, Ga. This coating has a total thickness of about 5 mils.

The multi-layer coating of the present invention preferably has an abrasion resistance of 50 liters/mil or greater, as measured by ASTM D 968-93 with Sand Material ASTM 20-30 C778, the coating hazing most preferably not prior to 250 liters of sand from the test fixture. The coating is thus ideal for a bias member in that it does not lose its effectiveness even after paper cycles of 1 to 50 million prints or more.

The multi-layer coating preferably has a 100% elongation modulus of 300 psi (minimum). It also has excellent thermal degradation resistance and humidity resistance, both significant properties for a member used in a xerographic device.

The electrical properties of the multi-layer coating, determined by applying an electrical potential (v) across the thickness of the coating and measuring the current (l) flow, is such that applied voltages of 150 and 400 volts yield current flows of about 27 and 130 microamperes, respectively. The current flow is stable with good IR linearity and no diode effect. In addition, the coating has a charge relaxation time constant of about 1 to about 10 milliseconds, and supports up to about 1000 volts of electrical potential.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A bias transfer member or bias charging member comprising a support substrate, and a multi-layer conductive surface coating over the support substrate comprising a base layer comprised of metal-containing particles in a polymer binder, an intermediate layer comprised of conductive particles in a polymer binder, and a top layer comprised of conductive particles in a polymer binder, wherein the amount of the conductive particles in the top layer is greater than the amount of the conductive particles in the intermediate layer.

2. The bias transfer member or bias charging member according to claim 1, wherein the support substrate is in roll form and comprises a metal or a polymer with a metal surface coating.

3. The bias transfer member or bias charging member according to claim 1, wherein the support substrate further comprises a deformable layer between the support substrate and the multi-layer conductive surface coating.

4. The bias transfer member or bias charging member according to claim 3, wherein the deformable layer comprises a foam, an elastomer or a rubber.

5. The bias transfer member or bias charging member according to claim 1, wherein the polymer binder of each of the base layer, the intermediate layer and the top layer are the same or different, and are selected from the group consisting of polyurethanes, polyureas, polyolefins, polyesters, polyamides and mixtures or copolymers thereof.

6. The bias transfer member or bias charging member according to claim 1, wherein the metal-containing particles contain one or more metals of magnesium, tin and aluminum.

7. The bias transfer member or bias charging member according to claim 1, wherein the metal-containing particles of the base layer are spherical, rods or both.

8. The bias transfer member or bias charging member according to claim 7, wherein the spherical particles have an average volume diameter of about 10.0 microns or less and the rods have an average volume length of about 1.0 microns or less.

9. The bias transfer member or bias charging member according to claim 7, wherein the metal-containing particles contain one or more metals of magnesium, tin and aluminum.

10. The bias transfer member or bias charging member according to claim 9, wherein the metal-containing particles further contain at least one non-metal component.

11. The bias transfer member or bias charging member according to claim 10, wherein the non-metal component is silicon.

12. The bias transfer member or bias charging member according to claim 11, wherein the base layer contains metal-containing spherical particles comprised of magnesium, tin and silicon and contains metal-containing rods comprised of aluminum and silicon.

13. The bias transfer member or bias charging member according to claim 1, wherein the conductive particles of each of the intermediate layer and the top layer are the same or different, and are selected from the group consisting of carbon black and graphite.

14. The bias transfer member or bias charging member according to claim 13, wherein the conductive particles of both the intermediate layer and the top layer are carbon black.

15. The bias transfer member or bias charging member according to claim 1, wherein the top layer contains at least about 10% by weight of the conductive particles.

16. The bias transfer member or bias charging member according to claim 1, wherein the base layer has a thickness of about 75 microns or less, the intermediate layer has a thickness of about 100 microns or less and the top layer has a thickness of about 75 microns or less.

17. The bias transfer member or bias charging member according to claim 1, wherein the conductive surface coating has a total thickness of about 200 microns or less.

18. The bias transfer member or bias charging member according to claim 1, wherein the surface conductive coating has a relaxation time constant of from about 1 to about 10 milliseconds.

19. A xerographic device including at least one of a bias transfer member or a bias charging member according to claim 1.

* * * * *